(12) United States Patent
Stevens et al.

(10) Patent No.: US 11,836,490 B2
(45) Date of Patent: Dec. 5, 2023

(54) KERNEL COEFFICIENT QUANTIZATION

(71) Applicant: Nvidia Corporation, Santa Clara, CA (US)

(72) Inventors: Michael Stevens, Snohomish, WA (US); Amit Purwar, Pune (IN); Sean Pieper, San Jose, CA (US); Eric Dujardin, San Jose, CA (US)

(73) Assignee: Nvidia Corporation, Santa Clara, CA (US)

( * ) Notice: Subject to any disclaimer, the term of this patent is extended or adjusted under 35 U.S.C. 154(b) by 847 days.

(21) Appl. No.: 16/684,275

(22) Filed: Nov. 14, 2019

(65) Prior Publication Data

US 2021/0149670 A1 May 20, 2021

(51) Int. Cl.
*G06F 9/30* (2018.01)
*G06F 9/54* (2006.01)
*G06F 17/16* (2006.01)
*G06F 7/499* (2006.01)
*G06F 9/50* (2006.01)

(52) U.S. Cl.
CPC ...... *G06F 9/30036* (2013.01); *G06F 7/49915* (2013.01); *G06F 9/5027* (2013.01); *G06F 9/545* (2013.01); *G06F 17/16* (2013.01)

(58) Field of Classification Search
CPC ...... G06F 9/30036; G06F 9/545; G06F 17/16; G06F 7/49915; G06F 9/5027; G06F 209/5017; G06F 9/5066

USPC .......................................................... 708/204
See application file for complete search history.

(56) References Cited

U.S. PATENT DOCUMENTS

| 11,308,389 B2 * | 4/2022 | Liu ...................... G06N 3/0454 |
| 2015/0227429 A1 † | 8/2015 | Henry et al. |
| 2020/0363549 A1 * | 11/2020 | Liu .......................... G06F 17/18 |

OTHER PUBLICATIONS

Rahimi, Abbas, et al., A variability-aware openmp environment for efficient execution of accuracy-configurable computation on shared-fpu processor clusters, 2013 International Conference on Hardware/Software Codesign and System Synthesis (CODES+ ISSS). IEEE, 2013.†
Ho, Nhut-Minh, et al. Efficient floating point precision tuning for approximate computing, 2017 22nd Asia and South Pacific Design Automation Conference (ASP-DAC). IEEE, 2017.†
Jerez, Juan Luis, George A. Constantinides, and Eric C. Kerrigan, A low complexity scaling method for the lanczos kernel in fixed-point arithmetic, IEEE Transactions on Computers 64.2 (2013):303-315.†

* cited by examiner
† cited by third party

*Primary Examiner* — Tan V Mai
(74) *Attorney, Agent, or Firm* — Hogan Lovells US LLP

(57) ABSTRACT

Apparatuses, systems, and techniques to optimize memory usage when performing matrix operations. In at least one embodiment, a matrix is optimized to limit memory and storage requirements while minimizing loss of precision for a sum of the members of the matrix.

20 Claims, 5 Drawing Sheets

KERNEL COEFFICIENT QUANTIZATION

FIELD

The present application relates generally to optimizing processing resources and minimizing information loss in the conversion of large data sets between data representation schemas. For example, at least one embodiment pertains to processors or computer systems used to convert a matrix of values stored as real number representations to a fixed point representation with minimal loss to the sum of the values within the matrix.

BACKGROUND

Conversion of matrices from real numbers to fixed point representation is a common operation that occurs in a variety of fields and applications. These filter kernels may be of arbitrary dimension, and may or may not have symmetry. In many instances, the sum of the kernel coefficients is a property of particular importance, particularly if that sum is an integer. This is an added constraint apart from getting the desired filter parameter for the desired usage.

BRIEF DESCRIPTION OF THE DRAWINGS

FIG. 1 illustrates a representation of a matrix of real numbers;

FIG. 2 illustrates a representation of a matrix of real numbers with horizontal and vertical symmetry;

FIG. 3 illustrates a representation of a matrix of real number with horizontal, vertical, and diagonal symmetry.

DETAILED DESCRIPTION

Figure 4:
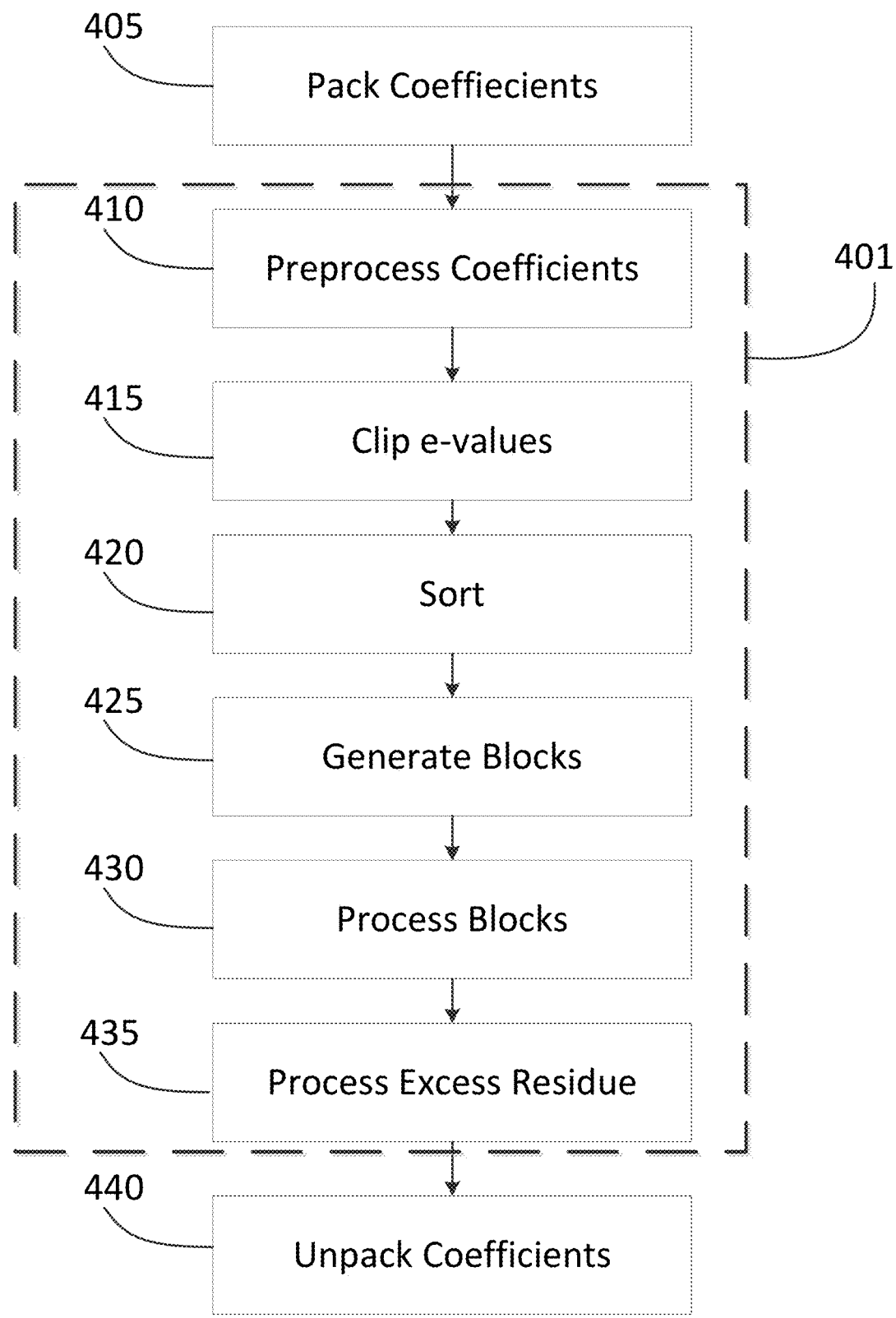
FIG. 4 illustrates a flowchart of one or more embodiments.

In a set of kernel coefficients, the numerical values may be represented in a number of different formats, each with separate storage constraints. For example, for a given large number, the selection of one storage format, such as a real number format, has a range in which the number may be represented in memory. However, in many applications, a particular number format may be required or may result in more efficient computer resource usage when performing other operations. For example, a number that is initially stored as a real number may be converted to a fixed point representation so that less computer resources would be required to perform matrix manipulations. However, in a conversion between numerical formats, loss of precision may be significant. Further, after additional operations are performed on the converted values, the error values for results may include additional error that is undesirable. For example, converting values from floating point to fixed point representation introduces error.

A set of kernel coefficients for conversions between linear subspaces often includes very large quantities. Kernel coefficients are often represented by matrices that may have any dimension, depending on the application. Because the coefficients are very large numbers with high precision and the matrices may be of large dimensions, significant storage space may be required. Further, mathematical operations performed on the coefficients often use more processing resources than the same numerical manipulation of the same numbers stored with less precision. Storing the values so that each coefficient is stored using fewer bits optimizes the resource requirements, but at a cost of precision loss.

In some embodiments, a matrix is received. The matrix may include a plurality of values, each of which may be represented by a mantissa and an exponent, such as floating point values. In some embodiments, the matrix may be received with one or more operations to be performed on the matrix. For example, the matrix may be received with a request to perform matrix addition and/or subtraction. Because these operations may be resource-intensive to perform on floating point values, one or more components may determine that, based on the size and dimensions of the matrix, the needed resources to perform the operation exceeds a threshold. The matrix may be converted to a format that is more conducive to addition, subtraction, and/or multiplication such as a fixed point representation. Once converted, the matrix can again be checked to determine if the needed resources are acceptable. If so, the operation may be performed, and a result returned. Because the sum of the values of a matrix is often an important value for some applications, the conversion is performed to preserve the sum with minimal error.

The present embodiments assume that a matrix of values, each represented as a floating point value, are to be converted to fixed point values. The conversion is performed such that the sum of the values is preserved with a minimized error term. For each initial value, the real numbers are each represented as a floating point value, with a mantissa and an exponent. The mantissa may be stored as a signed two's complement integer of a set number of bits. The exponent value is also of a set number of bits. The resulting fixed point values are each represented by an integer value and a fractional value, each of a fixed number of bits.

As an example, a number may be stored using a standard single precision floating point representation. The representation allows for values between $1.2 \times 10^{-38}$ and $3.4 \times 10^{38}$ and can be represented by 32 bits, which are the mantissa bits. In this representation, a number may be stored with a precision of 23 bits and with an exponent that may be stored as 8 bits. Thus, with a sign bit, a number may be stored with 32 total bits. For a fixed point representation, the same storage amount results in significantly less precision and therefore a much smaller range of values. However, arithmetic operations performed on the fixed point representations is significantly more efficient than the same operations on the floating point representations.

For the present embodiments, the following equations are utilized for the metes and bounds of a matrix of values, such as a filter kernel of coefficients. For ease of explanation, a 2-dimensional array that is 5×5 is described. However, the same embodiments are applicable to matrices of any size or dimension.

Each kernel coefficient may be stored as a mantissa m and an exponent e. For a given representation of a mantissa with $B_m$ bits, the integer mantissa of the i'th kernel coefficient, $m_i$, is bound as follows:

$$M_{min} \leq m^i \leq M_{max}, \text{ with}$$

$$M_{min} = -2^{(B_m-1)} \text{ and}$$

$$M_{max}(2^{(B_m-1)})-1$$

Further, the exponent $e_i$ of the i'th kernel coefficient is bound to the range:

$$(E_g - E_i) \leq e_i \leq E_g$$

$$E_{gmin} \leq E_g < E_{gmax}$$

with $E_g$ being the global integer scale factor shared by the entire kernel and $E_i$ being the maximum integer scale factor adjustment for any coefficient. Thus, for the i'th kernel coefficient, $C_i$ may be defined as:

$$C_i = 2^{e_i} m_i.$$

This equation can be explained as an integer mantissa with a power of 2 exponent. It is these C-values that are utilized to preserve a matrix with minimal error in the sum of the values after conversion.

Figures 1, 2, 3:
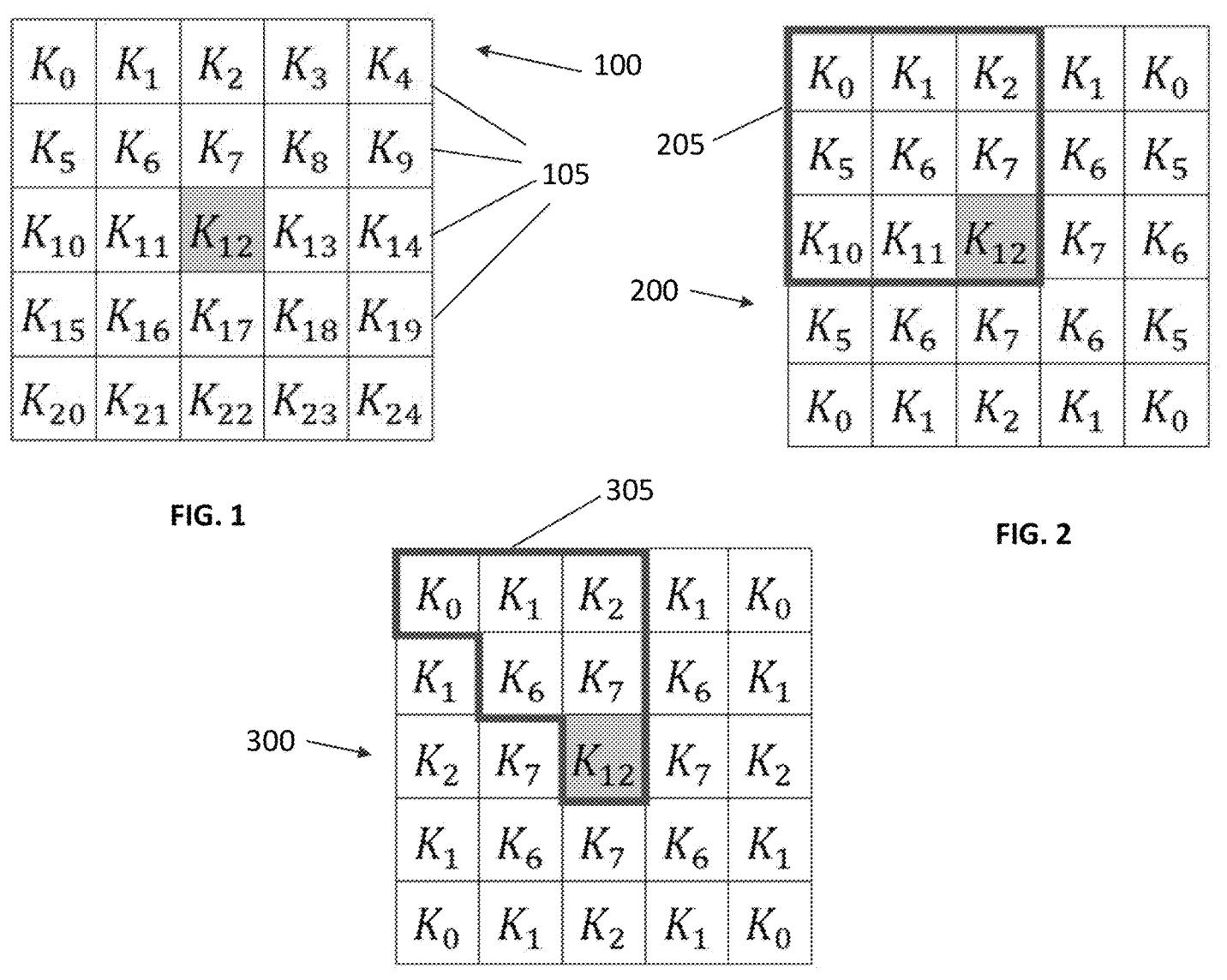

Referring to FIG. 1, a representation of a kernel coefficient matrix 100 of size 5×5 is illustrated. Each cell 105 includes a floating point value, labeled $K_0$ through $K_{24}$, each of which is to be converted to a fixed point value. For each of the values, a C-value can be calculated (e.g., $C_0$ is calculated from $K_0$, $C_1$ is calculated from $K_1$).

The matrix of FIG. 1 contains unique values for each of the cells. However, in some embodiments, a matrix may have horizontal, vertical, and/or diagonal symmetry, particularly when the matrix is of kernel coefficients. For example, referring to FIG. 2, a matrix 200 is illustrated that has both vertical and horizontal symmetry. As shown, the region 205 includes the only cell values that are unique to the matrix. The remaining cells have one of those values such that the left of the matrix is a mirror of the right of the matrix, the property of vertical symmetry. Further, the top half of the matrix is a mirror of the bottom half of the matrix, the property of horizontal symmetry. Referring to FIG. 3, a matrix with diagonal symmetry is illustrated. In matrix 300, the diagonals in both directions are mirrored around the center of the matrix, labeled $K_{12}$ and shown as a shaded cell. The values in region 305 are the only unique values in the matrix.

For any matrix, values of $r_i$ may be calculated, defined as:

$2^{r_i}$ = Number of occurrences of $K_i$ in the matrix

For a matrix with no symmetry and no repeated values, such as matrix 100, all r-values will be 0 since $2^0 = 1$. For matrices with symmetry, the r-values will reflect the number of occurrences of each value. For example, for matrix 200, $r_0 = 2$ because $K_0$ appears in the matrix four times. Similarly, the matrix 200 has the r-values of:

$r_0 = 2$ $r_1 = 2$ $r_2 = 1$ $r_5 = 2$ $r_6 = 2$ $r_7 = 1$ $r_{10} = 1$ $r_{11} = 1$ $r_{12} = 0$

Similarly, matrix 300 has the r-values:

$r_0 = 2$ $r_1 = 3$ $r_2 = 2$ $r_6 = 2$ $r_7 = 2$ $r_{12} = 0$

The sum of kernel coefficients S can be calculated as follows:

$$S = \sum_i 2^{r_i} C_i$$

The $2^{r_i}$ factor takes into account the number of times each coefficient occurs in the kernel. Since the individual coefficients are quantized, the sum is also quantized. Substituting from the previous definition of $C_i$ and exponential manipulation, $$S = \sum_i 2^{r_i} 2^{e_i} m_i = \sum_i 2^{(r_i + e_i)} m_i$$

Since $m_i$ is an integer, the i'th coefficient can only affect the sum in increments of $2^{(r_i + e_i)}$. This quantity is the granularity $g_i$ of the value each cell in the matrix. Taking into account all of the $g_i$ values, the matrix g sum g is the minimum of all of the $g_i$ values. Thus, the sum of the matrix will always be a multiple of g, with no intermediate values possible.

Referring to FIG. 4, a flowchart of the steps of an embodiment of the method described herein is provided. In some embodiments, one or more of the steps of the illustrated flowchart may be omitted. For example, in some embodiments, step 405 may be emitted in instances where the coefficients have already been packed. In some embodiments, one or more additional steps may be included. For example, in some embodiments, step 435 may be followed with one or more processes or components that utilize the converted coefficients. As illustrated, because steps 405 and 440 are outside of the core method 401, no knowledge of the matrix geometry, such as its symmetry, is needed.

At step 405, the coefficients are packed for further processing. At this step, the matrix is investigated to determine the r-values for the matrix and the symmetry of the matrix. Any r-values of 0 are removed from the resulting list. Additionally, the C-values for each value are determined, based on the previously defined equation.

At step 410, the coefficients for the matrix are preprocessed. The e-values and g-values are determined for each value in the matrix. This step further includes determining the largest e-value for the matrix by checking the e-value of each coefficient and selecting the highest value. This e-value, $E_g$, is associated with the value in the matrix that has the highest amount of information that may be lost during conversion.

At step 415, the e-value for each of the matrix cells is clipped to fall within a valid range. This range is based on the value $E_g$. However, for each e-value that is clipped, additional error is introduced into the matrix sum, S. This error is called the residue error R. This value is the difference between the original value for each cell of the matrix and the quantized coefficient $C_i$ for each cell of the matrix. A sum of the R-values for each value of the matrix results in the matrix residue R:

$$R_i = 2^{r_i}(K_i - C_i)$$
$$R_i = 2^{r_i}(K_i - 2^{e_i}m_i)$$
$$R = \sum_i R_i$$

By minimizing R, less error is introduced when determining a matrix sum. For each of the values, the mantissa, granularity, and R-value are determined by:

$$m_i = \left\lfloor \frac{K_i}{2^{e_i}} \right\rfloor$$
$$g_i = 2^{(r_i + e_i)}$$
$$R_i = 2^{r_i}(K_i - 2^{e_i}m_i)$$

After step 415, the e-values (exponent values), g-values (granularity values), and R-values (residue values) are known for each value in the matrix. At this point, all R-values are positive. However, the mantissa values are still preliminary at this point. For any mantissa that is incremented subsequently, the R-value for that value in the matrix will be negative. This is the primary mechanic for minimizing R.

At step 420, the values in the matrix that have corresponding r-values are sorted. This step is optional. However, a list of the values, sorted by decreasing g-values, improves the efficiency in subsequent steps. Any known method of sorting may be utilized to sort the list of values.

At step 425, the coefficients are grouped into blocks. Each block is processed, and then a new block is assembled and processed until all the coefficients have been processed. Processing the coefficients from those with higher g-values to low g-values may produce better results. Thus, sorting the list at step 420 improves the results of this step.

Blocks may be determined based on two criteria. First, a maximum block size may be specified. Once the block includes the specified number of values, the next block may be processed. Second, a block may be limited to a constant granularity value. Once a different granularity value is identified, the current block may be terminated, and a new block started. In some embodiments, one or both of these criteria may be specified. As described herein, the block size will be the number of values in the matrix, which is 25 for the matrices of FIGS. 1-3. Further, each block will include a constant granularity. Once each block is constructed, an R-value is calculated by adding the R-values of each value in the block.

At step 430, the mantissas for each value are adjusted to minimize the R-values of the blocks. The minimized R-value can be determined as follows:

If $R \geq \alpha g_i$, $m_i = m_i + 1$ $R = R - g_i$

The value $\alpha$ is a unitless constant that controls the convergence of R for a given block. For example, in some embodiments, $\alpha$ may be set at ½, thus constraining R to a value between -½ the granularity of a given coefficient and ½ of the granularity of the given coefficient. Thus, for each coefficient in a block, if the current R-value for the block is greater than half the g-value for a given coefficient, R is decremented by the g-value (constant for the block) and the mantissa of that coefficient is incremented. The new R-value is then used to compare with the next coefficient in the block. This continues until R is no longer outside of the convergence range.

At step 435, excess residue is processed. This includes distributing any excess residue remaining from processing the last block. This can occur in instances where the last block, which contains coefficients with the smallest g-values, does not have enough coefficients to constrain the R-value for that block into the convergence range, described in regards to step 430. In some embodiments, this may not occur, such as when the input kernel sum is an integer.

For each of the coefficients for the final block, the mantissa is checked versus the maximum and minimum number of bits allowed to represent a mantissa, as previously described. A delta value is calculated for the block, as follows:

$$\Delta = \left\lfloor \frac{R}{g_i} + \alpha_f \right\rfloor$$

The value $\alpha_f$ is a unitless constant that controls the convergence of R for the final block. For each of the coefficients in the final block, the mantissa is adjusted by $\Delta$. If $m_i + \Delta$ does not fall within the range of allowed mantissas, the mantissa is adjusted to the maximum or minimum allowed mantissa. This clips the mantissas of the final block to fall within a valid range.

At step 440, the coefficients, now converted, are unpacked and the matrix is repopulated. This step is the reverse of step 405 and includes populating the matrix with the coefficients that are repeated in multiple cells, such as due to the symmetry of the matrix and populating all other cells with the corresponding converted coefficients. The resulting matrix is a matrix of fixed point coefficients that are converted to minimize the sum of the coefficients.

Figure 5:
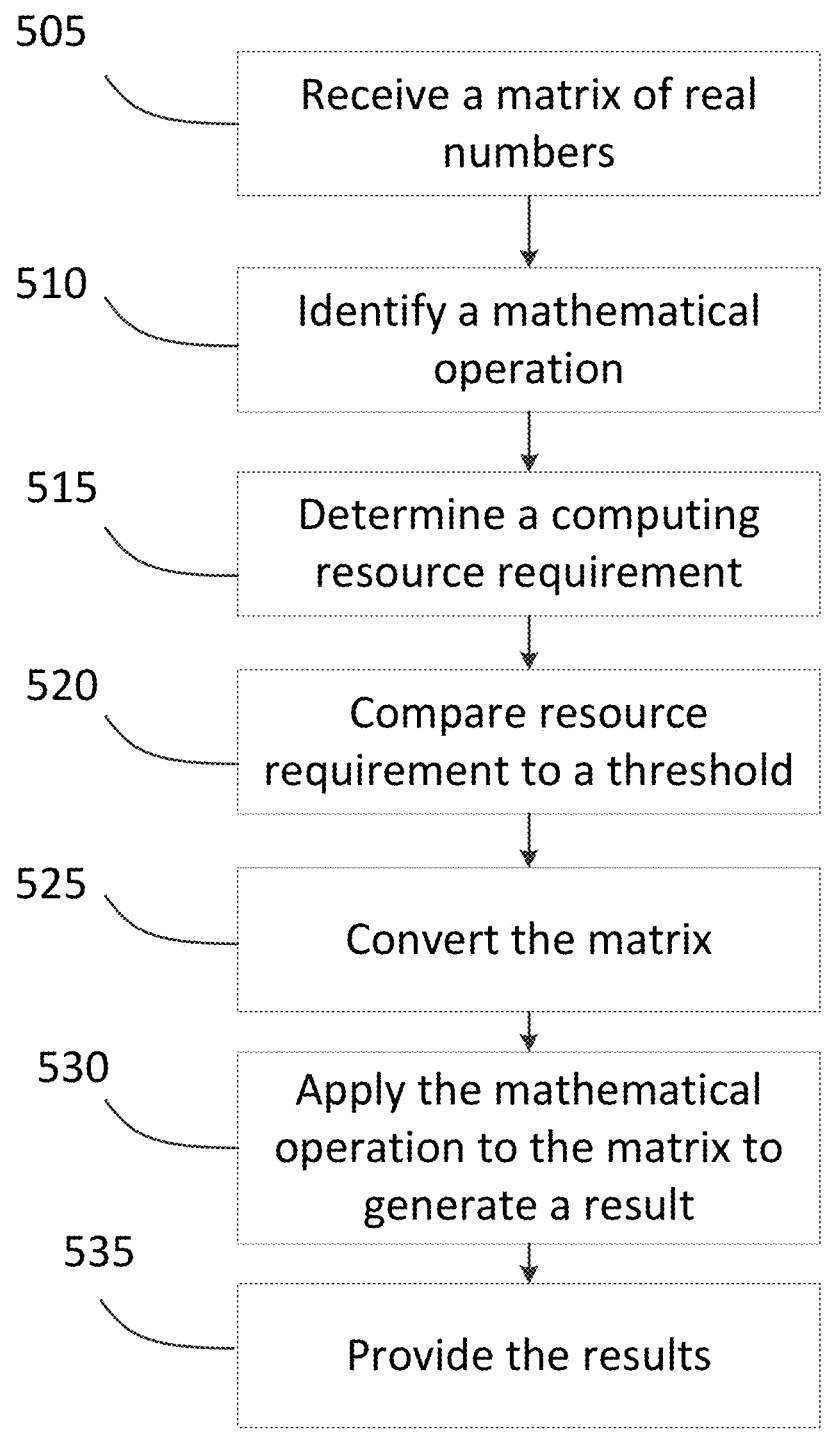
FIG. 5 illustrates a flowchart of one or more embodiments.

Referring to FIG. 5, a flowchart is provided illustrating one or more embodiments described herein. In some embodiments, one or more steps may be omitted. In some embodiments, one or more additional step may be included.

At step 505, the system receives a matrix of real numbers. The matrix may be of any size and dimension. In some embodiments, the received matrix may have one or more symmetrical properties, such as diagonal, vertical, or horizontal symmetry. The values stored in the matrix are real numbers and may be stored, for example, with a floating point representation. Thus, each value may be stored as a mantissa and an exponent portion.

At step 510, a mathematical operation to perform on the matrix is identified. In some embodiments, the mathematical operation may be provided to the system with the matrix. In some embodiments, one or more other components may provide the mathematical operation. The mathematical operation may be, for example, matrix addition, subtraction, or one or more matrix transformations. In some embodiments, the mathematical operation may include operations performed utilizing only one matrix. For example, the operation may include manipulations of one or more values stored in a matrix. In some embodiments, the operation may include multiple matrices and/or vectors. For example, an operation may include multiplication of two matrices, multiplication of a matrix and a vector, and/or other operations that may include multiple matrices, each of which may be converted before the operation is performed.

At step 515, the system computes a computer resource requirement for performing the mathematical operation on the matrix. The computer resource requirement may be, for example, an estimation of a number of computer cycles may be required to perform the operation, storage in memory that may be required to perform the operation, or one or more other computer resources that may be expended while performing the operation.

At step 520, the computer resource requirement may be compared to a threshold to determine whether conversion of the matrix will improve the operation of the computing system. The threshold may be a fixed value, such as a maximum amount of computer power to allocate for the operation, a time constraint for the computation, or a memory limitation for performing the operation. In some embodiments, the system will continue to the next step only if the computer resource requirement exceeds a threshold. For example, the calculated computer resource requirement that is a time constraint to perform the operation may be more than a threshold amount of time. In some embodiments, the conversion of the matrix may be performed only when the threshold is exceeded. In some embodiments, the mathematical operation may be performed on the original matrix if the threshold is not exceeded.

At step 525, the matrix is converted to a matrix of fixed point values. The conversion of the matrix may be completed utilizing one or more of the techniques described herein. For example, the matrix conversion may be performed using the technique illustrated by FIG. 4. Thus, the conversion may be completed so that the converted matrix preserves the matrix sum with minimal error.

At step 530, the mathematical operation is applied to the converted matrix. For example, if the mathematical operation includes matrix addition, the system may perform the matrix addition, which is computationally less complex with fixed point numbers versus floating point numbers. In some embodiments, the mathematical operation may include one or more other matrices, which may have previously been converted from floating point to fixed point. At step 535, the results of applying the mathematical operation is provided to one or more systems for further processing.

Figure 6:
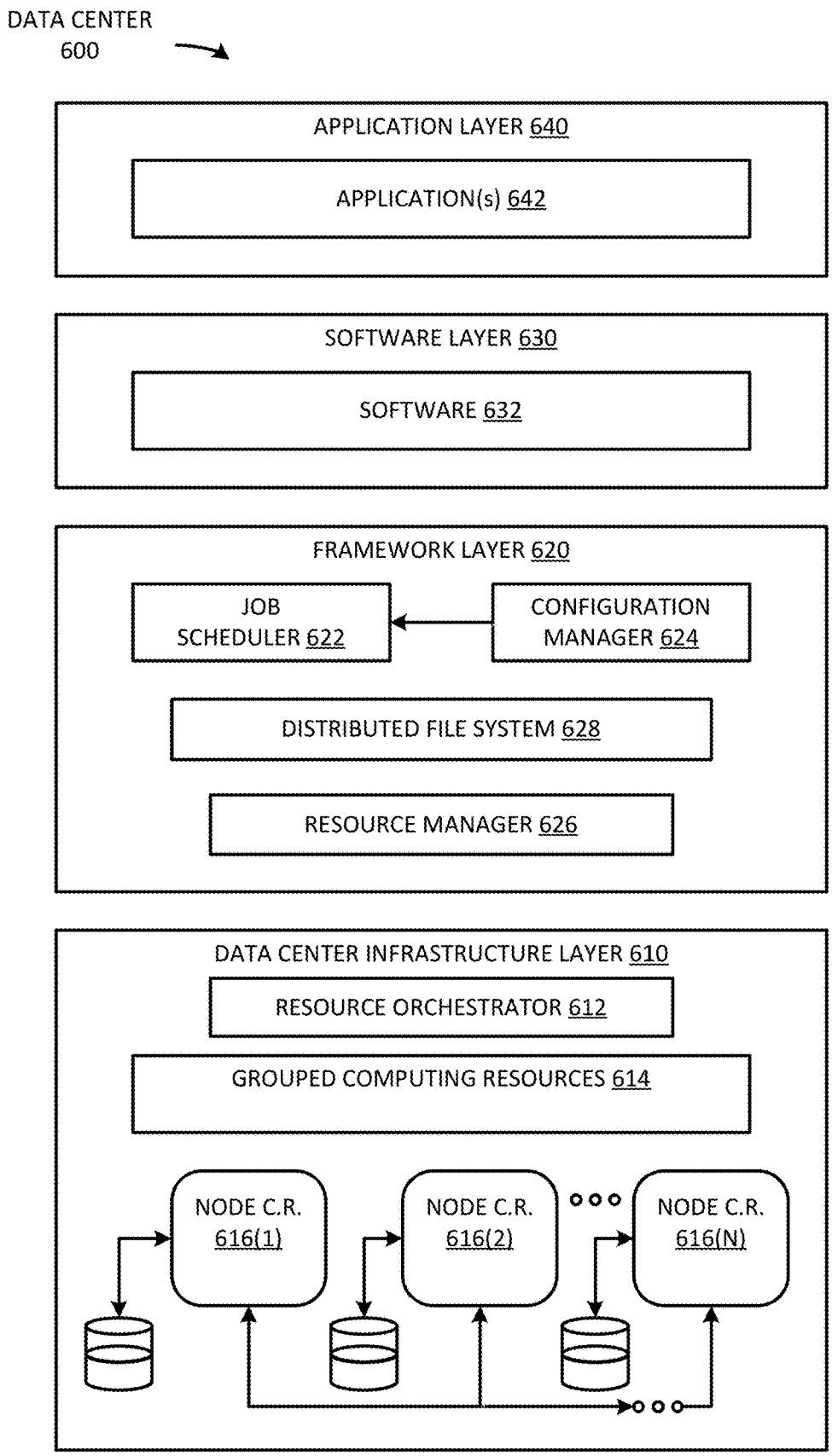
FIG. 6 illustrates a data center system, according to at least one embodiment.

FIG. 6 illustrates an example data center 600, in which at least one embodiment may be used. In at least one embodiment, data center 600 includes a data center infrastructure layer 610, a framework layer 620, a software layer 630, and an application layer 640.

In at least one embodiment, as shown in FIG. 6, data center infrastructure layer 610 may include a resource orchestrator 612, grouped computing resources 614, and node computing resources ("node C.R.s") 616(1)-616(N), where "N" represents any whole, positive integer. In at least one embodiment, node C.R.s 616(1)-1016(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 616(1)-1016(N) may be a server having one or more of above-mentioned computing resources.

In at least one embodiment, grouped computing resources 614 may include separate groupings of node C.R.s housed within one or more racks (not shown), or many racks housed in data centers at various geographical locations (also not shown). Separate groupings of node C.R.s within grouped computing resources 614 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 612 may configure or otherwise control one or more node C.R.s 616(1)-616(N) and/or grouped computing resources 614. In at least one embodiment, resource orchestrator 612 may include a software design infrastructure ("SDI") management entity for data center 600. In at least one embodiment, resource orchestrator may include hardware, software or some combination thereof.

In at least one embodiment, as shown in FIG. 6, framework layer 620 includes a job scheduler 622, a configuration manager 624, a resource manager 626 and a distributed file system 628. In at least one embodiment, framework layer 620 may include a framework to support software 632 of software layer 630 and/or one or more application(s) 642 of application layer 640. In at least one embodiment, software 632 or application(s) 642 may respectively include web-based service software or applications, such as those provided by Amazon Web Services, Google Cloud and Microsoft Azure. In at least one embodiment, framework layer 620 may be, but is not limited to, a type of free and open-source software web application framework such as Apache Spark™ (hereinafter "Spark") that may utilize distributed file system 628 for large-scale data processing (e.g., "big data"). In at least one embodiment, job scheduler 622 may include a Spark driver to facilitate scheduling of workloads supported by various layers of data center 600. In at least one embodiment, configuration manager 624 may be capable of configuring different layers such as software layer 630 and framework layer 620 including Spark and distributed file system 628 for supporting large-scale data processing. In at least one embodiment, resource manager 626 may be capable of managing clustered or grouped computing resources mapped to or allocated for support of distributed file system 628 and job scheduler 622. In at least one embodiment, clustered or grouped computing resources may include grouped computing resource 614 at data center infrastructure layer 610. In at least one embodiment, resource manager 626 may coordinate with resource orchestrator 612 to manage these mapped or allocated computing resources.

In at least one embodiment, software 632 included in software layer 630 may include software used by at least portions of node C.R.s 616(1)-616(N), grouped computing resources 614, and/or distributed file system 628 of framework layer 620. One or more types of software may include, but are not limited to, Internet web page search software, e-mail virus scan software, database software, and streaming video content software.

In at least one embodiment, application(s) 642 included in application layer 640 may include one or more types of applications used by at least portions of node C.R.s 616(1)-616(N), grouped computing resources 614, and/or distributed file system 628 of framework layer 620. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 624, resource manager 626, and resource orchestrator 612 may implement any number and type of self-modifying actions based on any amount and type of data acquired in any technically feasible fashion. In at least one embodiment, self-modifying actions may relieve a data center operator of data center 600 from making possibly bad configuration decisions and possibly avoiding underutilized and/or poor performing portions of a data center.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Figure 7:
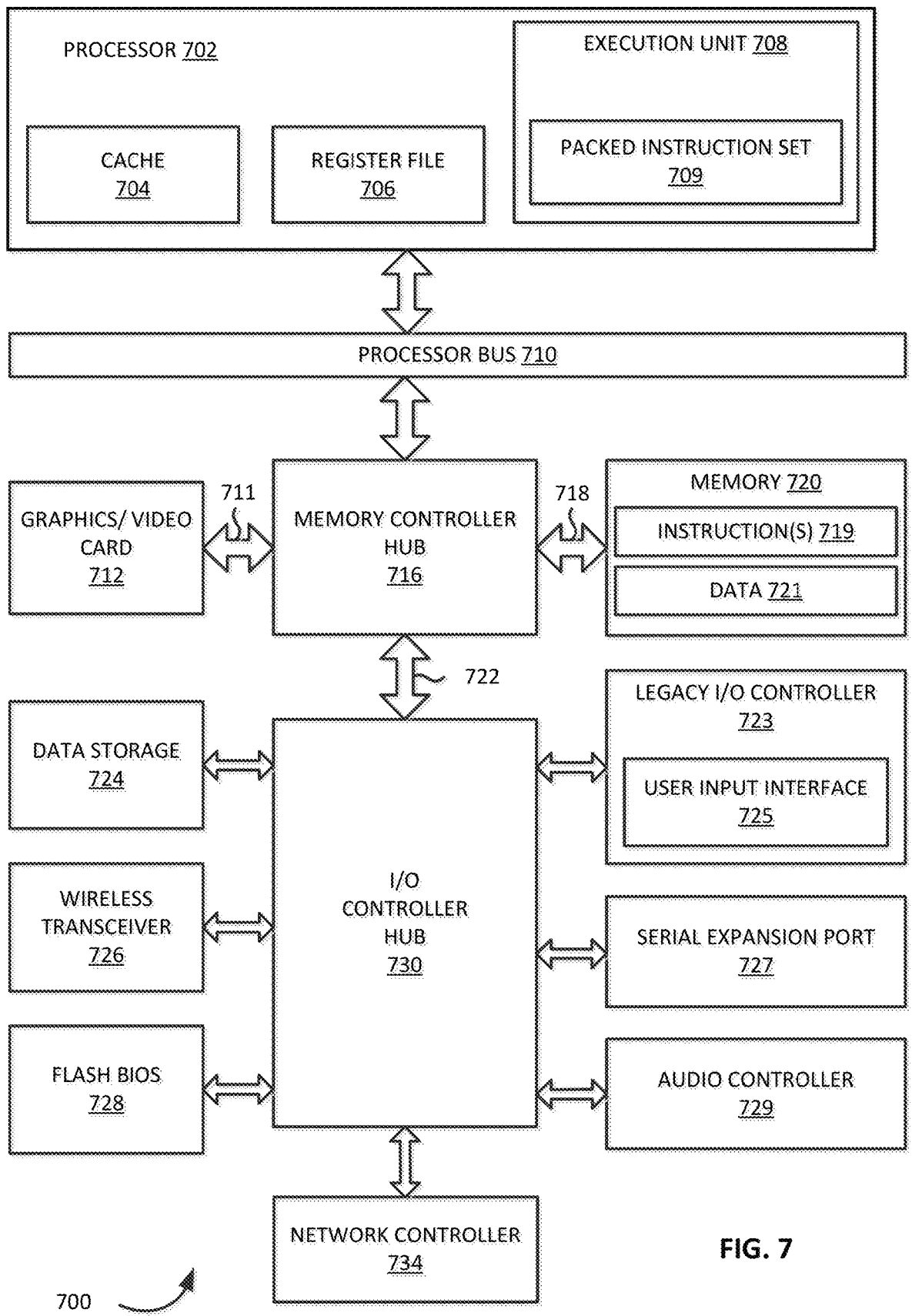
FIG. 7 illustrates a computer system, according to at least one embodiment.

FIG. 7 is a block diagram illustrating an exemplary computer system, which may be a system with interconnected devices and components, a system-on-a-chip (SOC) or some combination thereof 700 formed with a processor that may include execution units to execute an instruction, according to at least one embodiment. In at least one embodiment, computer system 700 may include, without limitation, a component, such as a processor 702 to employ execution units including logic to perform algorithms for process data, in accordance with present disclosure, such as in embodiment described herein. In at least one embodiment, computer system 700 may include processors, such as PENTIUM® Processor family, Xeon™, Itanium®, XScale™ and/or StrongARM™, Intel® Core™, or Intel® Nervana™ microprocessors available from Intel Corporation of Santa Clara, Calif., although other systems (including PCs having other microprocessors, engineering workstations, set-top boxes and like) may also be used. In at least one embodiment, computer system 700 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 700 may include, without limitation, processor 702 that may include, without limitation, one or more execution units 708 to perform machine learning model training and/or inferencing according to techniques described herein. In at least one embodiment, computer system 700 is a single processor desktop or server system, but in another embodiment computer system 700 may be a multiprocessor system. In at least one embodiment, processor 702 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 702 may be coupled to a processor bus 710 that may transmit data signals between processor 702 and other components in computer system 700.

In at least one embodiment, processor 702 may include, without limitation, a Level 1 ("L1") internal cache memory ("cache") 704. In at least one embodiment, processor 702 may have a single internal cache or multiple levels of internal cache. In at least one embodiment, cache memory may reside external to processor 702. Other embodiments may also include a combination of both internal and external caches depending on particular implementation and needs. In at least one embodiment, register file 706 may store different types of data in various registers including, without limitation, integer registers, floating point registers, status registers, and instruction pointer register.

In at least one embodiment, execution unit 708, including, without limitation, logic to perform integer and floating point operations, also resides in processor 702. In at least one embodiment, processor 702 may also include a microcode ("ucode") read only memory ("ROM") that stores microcode for certain macro instructions. In at least one embodiment, execution unit 708 may include logic to handle a packed instruction set 709. In at least one embodiment, by including packed instruction set 709 in an instruction set of a general-purpose processor 702, along with associated circuitry to execute instructions, operations used by many multimedia applications may be performed using packed data in a general-purpose processor 702. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 708 may also be used in microcontrollers, embedded processors, graphics devices, DSPs, and other types of logic circuits. In at least one embodiment, computer system 700 may include, without limitation, a memory 720. In at least one embodiment, memory 720 may be implemented as a Dynamic Random Access Memory ("DRAM") device, a Static Random Access Memory ("SRAM") device, flash memory device, or other memory device. In at least one embodiment, memory 720 may store instruction(s) 719 and/or data 721 represented by data signals that may be executed by processor 702.

In at least one embodiment, system logic chip may be coupled to processor bus 710 and memory 720. In at least one embodiment, system logic chip may include, without limitation, a memory controller hub ("MCH") 716, and processor 702 may communicate with MCH 716 via processor bus 710. In at least one embodiment, MCH 716 may provide a high bandwidth memory path 718 to memory 720 for instruction and data storage and for storage of graphics commands, data and textures. In at least one embodiment, MCH 716 may direct data signals between processor 702, memory 720, and other components in computer system 700 and to bridge data signals between processor bus 710, memory 720, and a system I/O 722. In at least one embodiment, system logic chip may provide a graphics port for coupling to a graphics controller. In at least one embodiment, MCH 716 may be coupled to memory 720 through a high bandwidth memory path 718 and graphics/video card 712 may be coupled to MCH 716 through an Accelerated Graphics Port ("AGP") interconnect, PCI Express bus, NVLink, AXI, or other proprietary busses with similar characteristics 711.

In at least one embodiment, computer system 700 may use system I/O 722 that is a proprietary hub interface bus to couple MCH 716 to I/O controller hub ("ICH") 730. In at least one embodiment, ICH 730 may provide direct connections to some I/O devices via a local I/O bus. In at least one embodiment, local I/O bus may include, without limitation, a high-speed I/O bus for connecting peripherals to memory 720, chipset, and processor 702. Examples may include, without limitation, an audio controller 729, a firmware hub ("flash BIOS") 728, a wireless transceiver 726, a data storage 724, a legacy I/O controller 723 containing user input and keyboard interfaces 725, a serial expansion port 727, such as Universal Serial Bus ("USB"), and a network controller 734. Data storage 724 may comprise a hard disk drive, a floppy disk drive, a CD-ROM device, a flash memory device, or other mass storage device.

In at least one embodiment, FIG. 7 illustrates a system, which includes interconnected hardware devices or "chips", whereas in other embodiments, FIG. 7 may illustrate an exemplary System on a Chip ("SoC"). In at least one embodiment, devices illustrated in FIG. 7 may be interconnected with proprietary interconnects, standardized interconnects (e.g., PCIe) or some combination thereof. In at least one embodiment, one or more components of computer system 700 are interconnected using compute express link (CXL) interconnects.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. process of obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method for optimizing matrix conversions, comprising:
   receiving a matrix of real numbers, wherein each real number is represented by a mantissa and an exponent;
   identifying a mathematical operation to be performed on the matrix;
   determining, based on the matrix and the mathematical operation, a computing resource requirement;
   determining that the required computing resource requirement exceeds a threshold;
   converting the matrix to a converted matrix, wherein the converted matrix minimizes error between a sum of the matrix and a sum of the converted matrix;
   generating a result based on the mathematical operation and the converted matrix; and
   providing the result.

2. The method of claim 1, wherein the matrix is a filter kernel.

3. The method of claim 1, wherein the matrix has at least one of horizontal, vertical, or diagonal symmetry, and wherein converting the matrix is at least partially based on the symmetry of the matrix.

4. The method of claim 1, wherein converting the matrix to a converted matrix includes:
   clipping one or more of the coefficients to reduce a number of storage bits for the one or more coefficients, and wherein the clipped storage bits are utilized to determine the error.

5. The method of claim 4, wherein clipping the one or more coefficients includes reducing a number of storage bits for the mantissa of one or more of the coefficients.

6. The method of claim 1, further comprising:
   determining, based on the converted matrix and the mathematical operation, a second computing resource requirement; and
   determining that the second required computing resource requirement does not exceed the threshold.

7. The method of claim 1, wherein the converted matrix includes entries that are represented as fixed point numbers.

8. The method of claim 1, wherein determining that the required computing resource requirement exceeds a threshold is based on at least one or the size of the matrix, maximum storage limit for the matrix, and a maximum computing time for performing the operation on the matrix.

9. The method of claim 1, further comprising:
receiving a second matrix of real numbers;
determining that the mathematical operation is to be performed on the matrix and the second matrix; and
converting the second matrix to a second converted matrix, wherein the second converted matrix minimizes error between a sum of the second matrix and a sum of the second converted matrix,
wherein generating the result is further based on the second converted matrix.

10. A system comprising:
one or more processors including a mathematical processor;
mathematical processing memory operable to perform one or more mathematical operations; and
memory including instructions that, when executed by the one or more processors, cause the system to:
receive a matrix of real numbers, wherein each real number is represented by a mantissa and an exponent;
identify a mathematical operation to be performed on the matrix by the mathematical processor using the mathematical processing memory;
determine, based at least on the matrix and the mathematical operation, a computing resource requirement;
determine, based on at least one of the mathematical processing memory and the mathematical processor, that the required computing resource requirement exceeds a threshold;
convert the matrix to a converted matrix, wherein the converted matrix minimizes error between a sum of the matrix and a sum of the converted matrix;
provide the converted matrix to the mathematical processing memory to cause mathematical processor to generate a result based on the mathematical operation and the converted matrix; and
provide the result.

11. The system of claim 10, wherein the memory further includes instructions to:
determine, based on the converted matrix and the mathematical operation, a second computing resource requirement; and
determine that the second required computing resource requirement does not exceed the threshold.

12. The system of claim 10, wherein the memory further includes instructions to:
clip one or more of the coefficients to reduce a number of storage bits for the one or more coefficients, and wherein the clipped storage bits are utilized to determine the error.

13. The system of claim 12, wherein clipping the one or more coefficients includes reducing a number of storage bits for the mantissa of one or more of the coefficients.

14. The system of claim 12, wherein the converted matrix includes entries that are represented as fixed point numbers.

15. The system of claim 12, wherein the memory further includes instructions to:
apply the result as a filter kernel to perform one or more image processing applications.

16. A non-transitory machine-readable medium having stored thereon a set of instructions, which if performed by one or more processors, cause the one or more processors to at least:
receive a square matrix of real numbers, wherein each real number is represented by a mantissa and an exponent;
identify a mathematical operation to be performed on the matrix;
determine, based on the matrix and the mathematical operation, a computing resource requirement;
determine that the required computing resource requirement exceeds a threshold;
convert the matrix to a converted matrix, wherein the converted matrix minimizes error between a sum of the matrix and a sum of the converted matrix;
generate a result based on the mathematical operation and the converted matrix; and
provide the result.

17. The non-transitory machine-readable medium of claim 16, wherein the set of instructions further includes instructions to:
determine, based on the converted matrix and the mathematical operation, a second computing resource requirement; and
determine that the second required computing resource requirement does not exceed the threshold.

18. The non-transitory machine-readable medium of claim 16, wherein the set of instructions further includes instructions to:
clip one or more of the coefficients to reduce a number of storage bits for the one or more coefficients, and wherein the clipped storage bits are utilized to determine the error.

19. The non-transitory machine-readable medium of claim 16, wherein clipping the one or more coefficients includes reducing a number of storage bits for the mantissa of one or more of the coefficients.

20. The non-transitory machine-readable medium of claim 16, wherein the converted matrix includes entries that are represented as fixed point numbers.

* * * * *